United States Patent
Chambers et al.

(10) Patent No.: US 8,099,194 B2
(45) Date of Patent: Jan. 17, 2012

(54) DEMAND CONTROL

(75) Inventors: Gregory L. Chambers, Atlanta, GA (US); Kenneth Van Meter, Alpharetta, GA (US)

(73) Assignee: Prenova, Inc., Atlanta, GA (US)

( * ) Notice: Subject to any disclaimer, the term of this patent is extended or adjusted under 35 U.S.C. 154(b) by 908 days.

(21) Appl. No.: 12/126,566

(22) Filed: May 23, 2008

(65) Prior Publication Data

US 2009/0132092 A1   May 21, 2009

Related U.S. Application Data

(60) Provisional application No. 60/988,939, filed on Nov. 19, 2007.

(51) Int. Cl.
*G06F 19/00* (2006.01)

(52) U.S. Cl. .............. 700/276; 700/19; 700/83; 700/86; 700/291; 715/716

(58) Field of Classification Search .................... 700/19, 700/83, 86, 276, 291, 300; 715/716; 454/258
See application file for complete search history.

(56) References Cited

U.S. PATENT DOCUMENTS

| | | | |
|---|---|---|---|
| 5,761,083 A | 6/1998 | Brown et al. | |
| 5,924,486 A | 7/1999 | Ehlers et al. | |
| 6,211,782 B1 | 4/2001 | Sandelman et al. | |
| 6,241,156 B1 | 6/2001 | Kline et al. | |
| 6,640,145 B2 * | 10/2003 | Hoffberg et al. | 700/83 |
| 6,741,915 B2 * | 5/2004 | Poth | 700/276 |
| 6,850,252 B1 * | 2/2005 | Hoffberg | 715/716 |
| 6,851,621 B1 | 2/2005 | Wacker et al. | |
| 6,868,295 B2 | 3/2005 | Huang | |
| 6,961,641 B1 | 11/2005 | Forth et al. | |
| 7,006,881 B1 * | 2/2006 | Hoffberg et al. | 700/83 |
| 7,216,043 B2 | 5/2007 | Ranson et al. | |
| 7,659,813 B2 | 2/2010 | Chambers et al. | |
| 2002/0022991 A1 | 2/2002 | Sharood et al. | |
| 2003/0171851 A1 | 9/2003 | Brickfield et al. | |
| 2003/0225483 A1 | 12/2003 | Santinato et al. | |
| 2004/0225513 A1 | 11/2004 | Haeberle et al. | |
| 2005/0038571 A1 | 2/2005 | Brickfield et al. | |
| 2005/0243867 A1 | 11/2005 | Petite | |

(Continued)

FOREIGN PATENT DOCUMENTS

EP   1196003   4/2002

(Continued)

OTHER PUBLICATIONS

Chambers, U.S. Appl. No. 12/126,556, filed May 23, 2008.

(Continued)

*Primary Examiner* — Albert Decady
*Assistant Examiner* — Douglas S. Lee
(74) *Attorney, Agent, or Firm* — Thomas, Kayden, Horstemeyer & Risley, LLP (57) ABSTRACT

Included are embodiments for demand control. At least one embodiment of a method includes sending a first control signal, the first control signal configured to indicate a first supply for an environment, the first supply based on a first environmental factor and a control setting and determining a change in a second environmental factor. Some embodiments include calculating a second supply for the environment, based on the determined change and sending a second control signal, the second control signal configured to indicate the second supply for the environment.

20 Claims, 9 Drawing Sheets

U.S. PATENT DOCUMENTS

| | | | |
|---|---|---|---|
| 2005/0275525 | A1 | 12/2005 | Ahmed |
| 2005/0278597 | A1 | 12/2005 | Miguelanez |
| 2006/0105697 | A1 | 5/2006 | Aronstam et al. |
| 2006/0155398 | A1* | 7/2006 | Hoffberg et al. ............... 700/86 |
| 2006/0191275 | A1 | 8/2006 | Jung et al. |
| 2006/0288101 | A1 | 12/2006 | Mastrodonato et al. |
| 2007/0005191 | A1 | 1/2007 | Sloup et al. |
| 2007/0038700 | A1 | 2/2007 | Eryurek et al. |
| 2007/0067656 | A1 | 3/2007 | Ranganathan et al. |

FOREIGN PATENT DOCUMENTS

| | | |
|---|---|---|
| GB | 2467981 | 8/2010 |
| GB | 2471759 | 1/2011 |
| WO | 2010033038 | 3/2010 |
| WO | 2011014073 | 2/2011 |

OTHER PUBLICATIONS

Clark, G. et al., "Artificial Intelligence and Networking in Integrated Building Management Systems." Automation in Construction, Elsevier Science Publishers, Amsterdam NL, vol. 5, No. 506, Sep. 1, 1997, pp. 481-198.

European Search Report dated Oct. 13, 2008 for PCT/US2007060271.

International Search Report and Written Opinion dated Oct. 24, 2007, for PCT/US2007060271.

Chambers; U.S. Appl. No. 12/126,556, filed May 23, 2008.

Chambers; U.S. Appl. No. 12/133,098, filed Jun. 4, 2008.

Chambers; U.S. Appl. No. 11/619,838, filed Jan. 4, 2007.

International Search Report and Written Opinion, dated Sep. 3, 2008.

* cited by examiner

DEMAND CONTROL

CROSS REFERENCE

This application claims the benefit of U.S. Provisional Application No. 60/988,939, entitled "Asset Control," filed Nov. 19, 2007, which is entirely incorporated herein by reference.

BACKGROUND

Utilization of one or more assets, including but not limited to, heater systems, air conditioning systems, refrigeration systems, alarm systems, security systems, appliances, electronics, and/or other devices associated with an environment and/or business equipment may result in a large amount of energy consumed and associated asset repair service costs. As energy costs may be a significant portion of a home's and/or business's budget, reduction of energy consumption and associated expenses may be desired. In an effort to reduce energy consumption and/or associated operating costs, many homes and/or businesses utilize control systems including, but not limited to, timers and other scheduling mechanisms to automatically activate or deactivate one or more assets at predetermined times and operate equipment to defined business parameters. Although these control systems may reduce energy usage, the systems are generally inflexible and may not effectively accommodate for continuing business changes to operations and schedules.

Similarly, some problems result from an inability of current implementations to accurately materialize environment settings. As a nonlimiting example, when people enter a room, an environment may deviate from the desired settings. Similarly, other factors, such as changing seasons, changing weather, etc. may alter the work required to materialize the desired settings

SUMMARY

Included are embodiments for demand control. At least one embodiment of a method includes sending a first control signal, the first control signal configured to indicate a first supply for an environment, the first supply based on a first environmental factor and a control setting and determining a change in a second environmental factor. Some embodiments include calculating a second supply for the environment, based on the determined change and sending a second control signal, the second control signal configured to indicate the second supply for the environment.

Also included are embodiments of a system. At least one embodiment includes a first sending component configured to send a first control signal, the first control signal configured to indicate a first supply for an environment, the first supply based on a first environmental factor and a control setting and a determining component configured to determine a change in a second environmental factor. Some embodiments include a calculating component configured to calculate a second supply for the environment, based on the determined change and a second sending component configured to send a second control signal, the second control signal configured to indicate the second supply for the environment.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
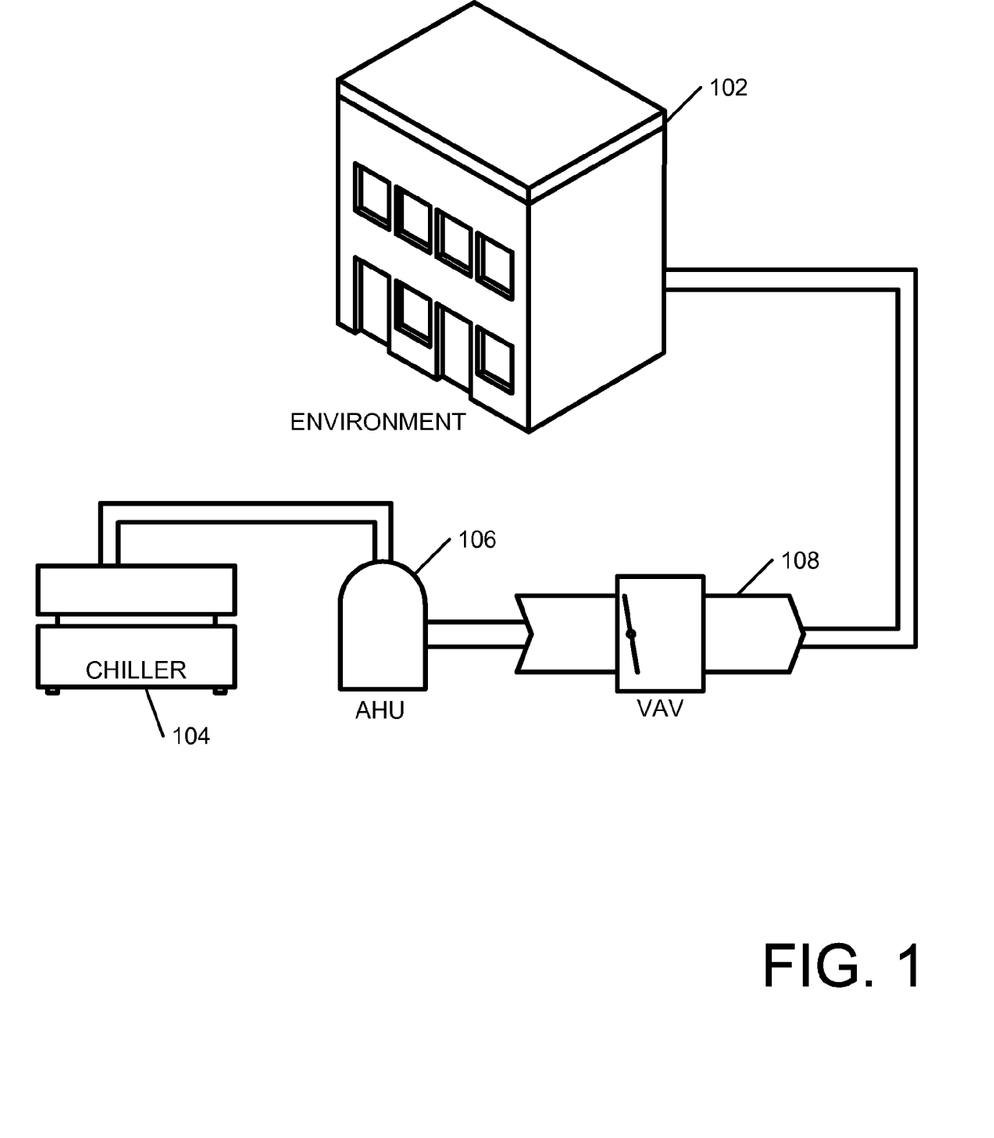
FIG. 1 depicts an environment with a plurality of exemplary components that may be utilized for providing at least one service to the environment.

FIG. 1 depicts an environment with a plurality of exemplary components that may be utilized for providing at least one service to the environment. As illustrated in the nonlimiting example of FIG. 1, an environment 102 can be coupled to a variable air volume (VAV) component 108, an air handler unit (AHU) 106, and a chiller 104. One should note that while the exemplary embodiments discussed herein may include a VAV, AHU, and a chiller, these are nonlimiting examples of assets that may be controlled. Other assets may be utilized on combination with or in substitution for these elements and considered within the scope of this disclosure.

In operation, the chiller 104 may be configured to receive outside air and chill (or heat, depending on the particular configuration) the received air to a desired temperature. The desired temperature may be determined via the AHU 106, which may include one or more fans, one or more heating and/or cooling coils, control circuitry and/or other components. Additionally, the VAV 108 may be configured to, under the control of the AHU 106, determine the volume of air supplied to the environment 102.

Figure 2:
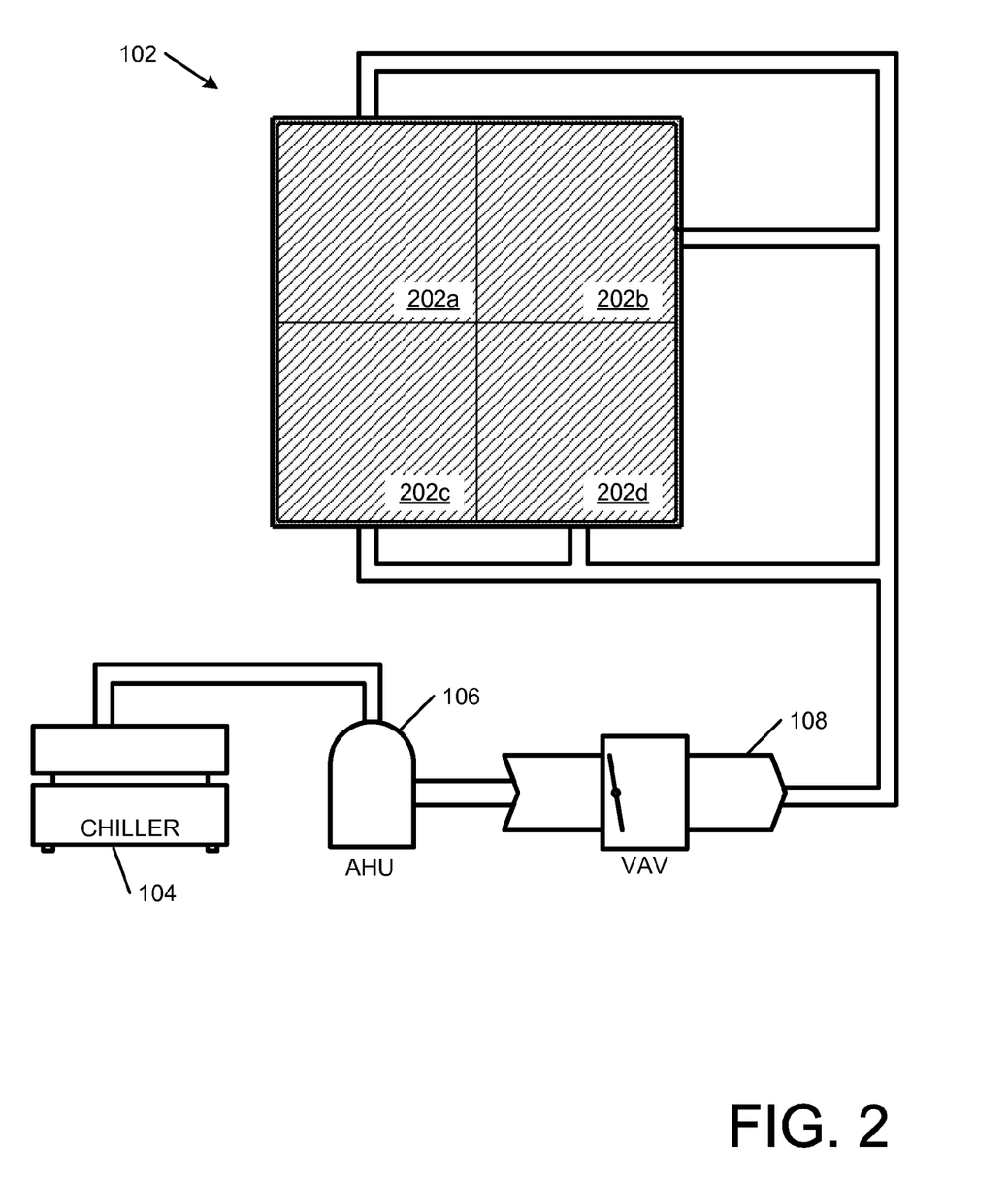
FIG. 2 depicts a plurality of exemplary components that may be utilized to serve a plurality of areas within an environment, similar to the diagram from FIG. 1.

FIG. 2 depicts a plurality of exemplary components that may be utilized to serve a plurality of areas within an environment, similar to the diagram from FIG. 1. As illustrated in the nonlimiting example of FIG. 2, the environment 102 may be divided in to a plurality of areas 202a-202d (which may be rooms; however, this is not a requirement). Additionally, the chiller 104, AHU 106, and VAV 108 may be configured to provide air control to one or more of the areas 202a-202d independently, collectively, and/or otherwise. One should also note that, depending on the particular configuration, one or more VAVs 108, AHUs 106, and/or chillers 104 may be utilized for any one environment 102. Similarly, one of these units may be configured to service a plurality of environments 102, depending on the particular embodiment. Similarly, while a configuration such as depicted in FIG. 2 may be configured to provide air conditioning, heating, and/or other services to the environment 102, oftentimes such a configuration may also be adapted to provide the desired temperature, humidity, and/or other settings.

Figure 3:
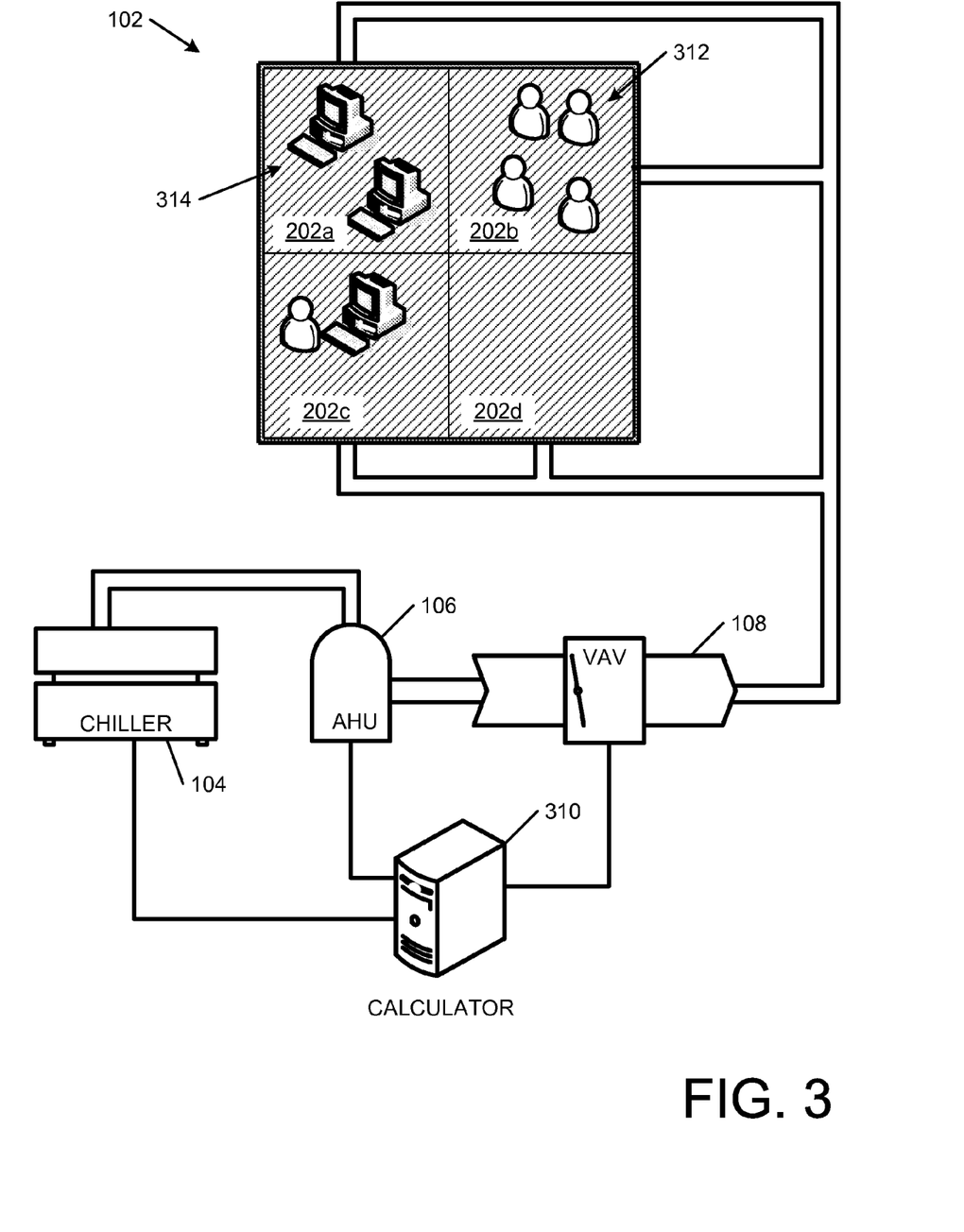
FIG. 3 depicts a plurality of exemplary components that may be utilized for adjusting settings in an environment according to one or more factors within the environment, similar to the diagram from FIG. 2.

FIG. 3 depicts a plurality of exemplary components that may be utilized for adjusting settings in an environment according to one or more factors within the environment, similar to the diagram from FIG. 2. As illustrated in the nonlimiting example of FIG. 3, the VAV 108, AHU 106, and chiller 104 may be coupled to the environment 102, as discussed above. However, one or more people 312, equipment 314, and/or other heat generating entities may alter one or more of the settings within the environment 102. More specifically, in area 202b, four people 312 may be conducting a meeting. Prior to the meeting, the area 202b was able to maintain a desired temperature, humidity, and/or other settings. However, with the introduction of the people 312, these settings may no longer be met. As such, the configuration of FIG. 3 may be adapted to enable the calculator 310 to determine a change in the area 202b (and/or other area). Upon making this determination, a calculator 310 may facilitate an alteration of airflow, as provided by the chiller 104, AHU 106, and/or VAV 108.

More specifically, as a nonlimiting example, the area 202b of environment 102 may include one or more sensors (e.g., visual sensors, weight sensors, proximity sensors, etc.) or other devices (such as a user interface for a user to enter the number of people, computers, etc.) for determining a predicted change in the area 202b. In this nonlimiting example, the calculator 310 may be configured to determine that four people 312 have entered the area 202b and, from this determination, calculate a predicted increase in temperature (and/or a change in humidity, demand for electrical power, etc.). Based on this calculation, the calculator 310 may change the air temperature, air volume, and/or other settings for accommodating the change in the area 202b to meet the predetermined settings.

Similarly, the area 202a may include a plurality of computing devices and/or other equipment 314. In at least one exemplary embodiment, the calculator 310 may be configured to determine that one or more of the equipment 314 has activated and/or has changed operation such that an the area 202a may be affected. The calculator 310 may also be configured to determine a predicted effect of this change to alter the air temperature, output volume, and/or other settings.

Additionally, depending on the particular configuration, the calculator 310 may be configured to store data regarding usage of one or more of the areas 202 in the environment 102 for predicting future usage. More specifically, the calculator 310 may be configured to document usage of the area 202b and determine that every Friday at 2:03 PM, between 4 and 6 people enter the area 202b and stay for approximately 48 minutes. Because of this determination, the calculator 310 can automatically begin making adjustments before anyone enters the room.

Figure 4:
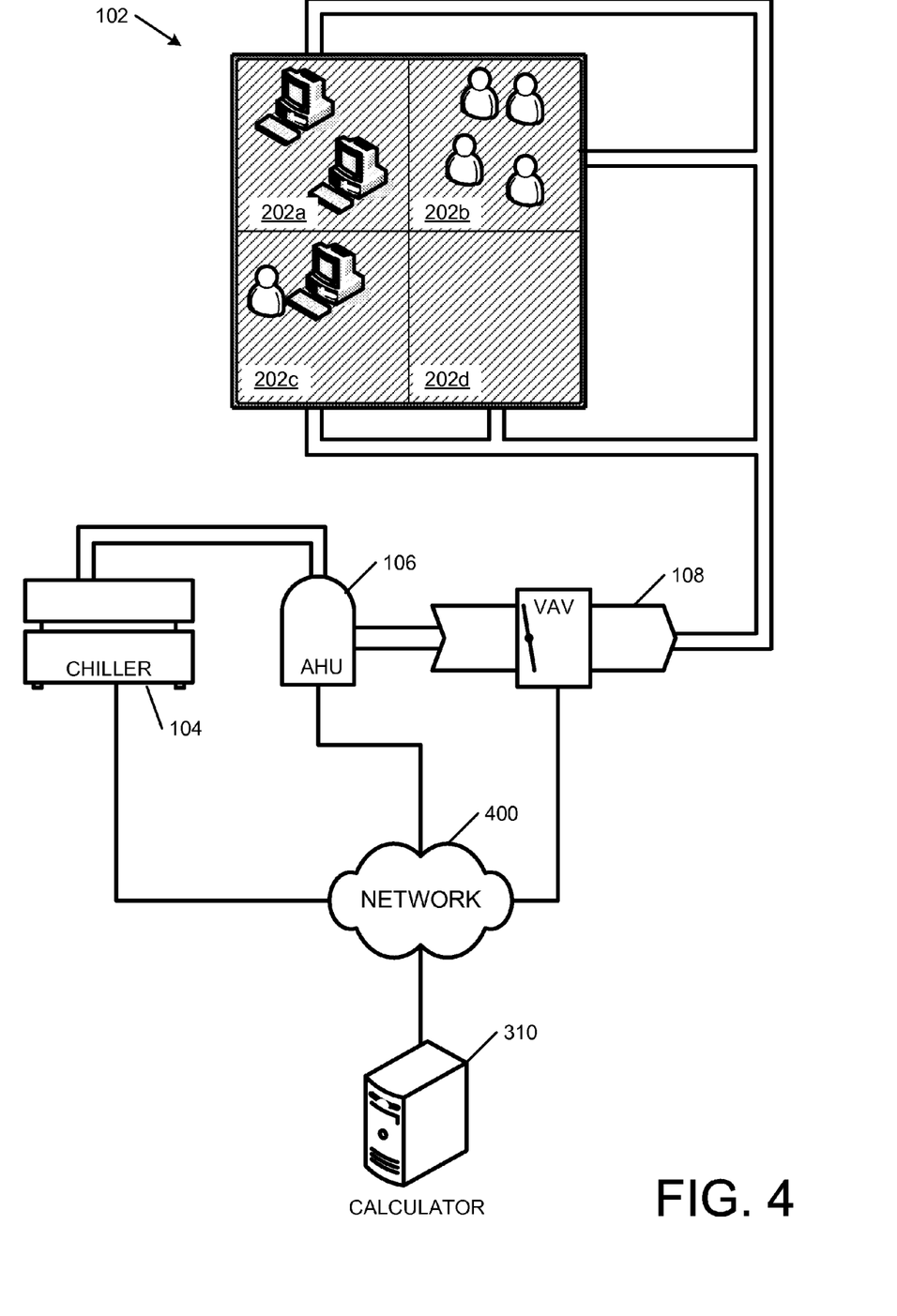
FIG. 4 depicts exemplary components that may be utilized to serve an environment, with assistance from a remote component, similar to the diagram from FIG. 3.

FIG. 4 depicts exemplary components that may be utilized to serve an environment, with assistance from a remote component, similar to the diagram from FIG. 3. As illustrated in the nonlimiting example of FIG. 4, the calculator 310 may be remotely located from the environment 102 and coupled to a network 400. The network may include the Internet, a Public Switched Telephone Network (PSTN), cellular network, Local Area Network (LAN), and/or other network. Additionally, FIG. 4 illustrates that, regardless of whether the calculator is located locally and/or remotely, functionality may be similar.

As a nonlimiting example, the calculator 310 may be configured to control components for one or more environments, in addition to the environment 102. The calculator 310 may be local to one environment and remote from other environments. Similarly, the calculator may be remotely located from all environments served by the calculator 310. Additionally, while the embodiment of FIG. 4 illustrated wired connections between the calculator 310 and the environment 102, this is also a nonlimiting example. More specifically, in at least one exemplary embodiment, the calculator may be configured to communicate wirelessly with one or more components and may serve mobile environments such as automobiles, airplanes, etc.

Figure 5:
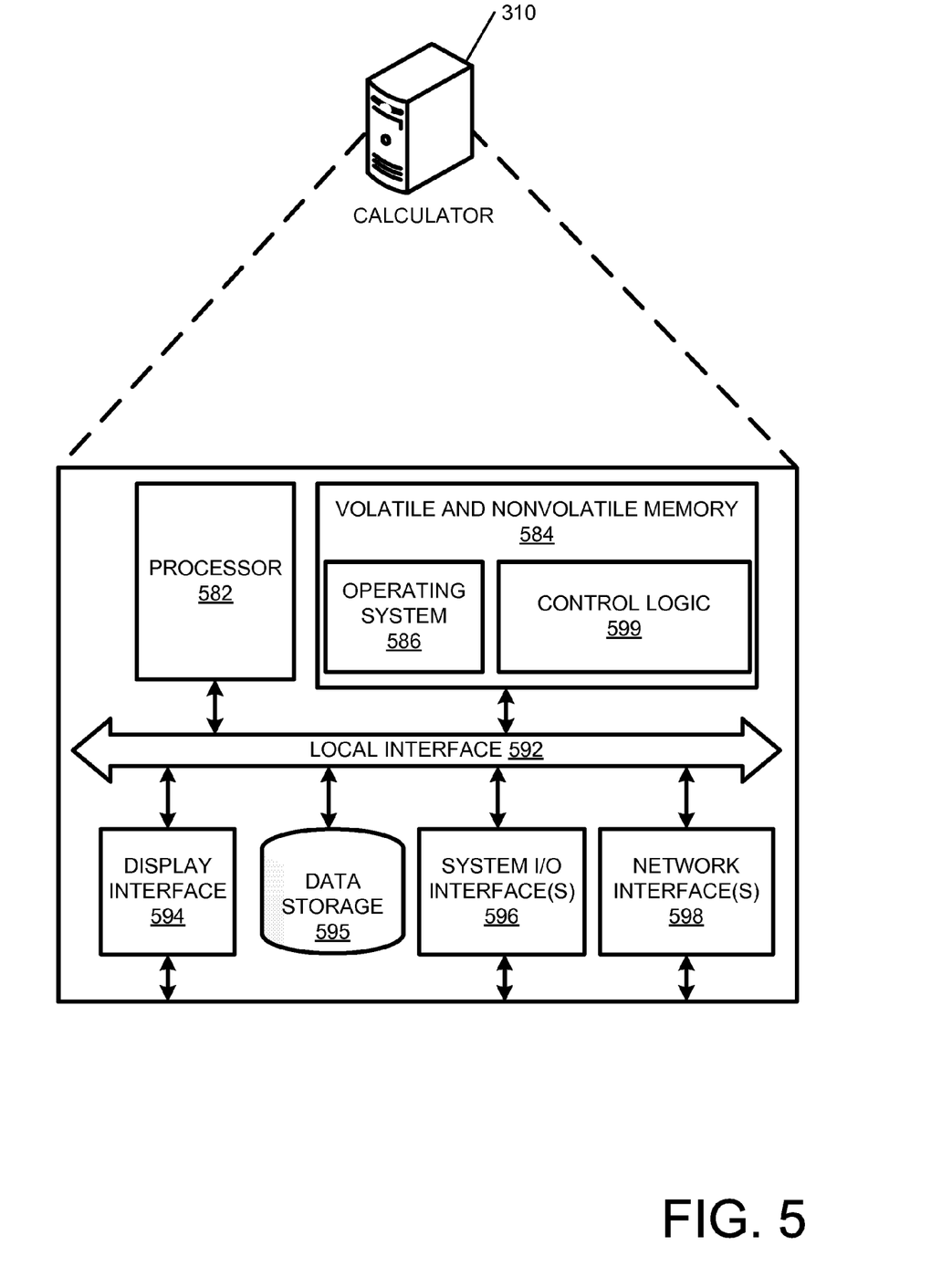
FIG. 5 depicts an exemplary calculator, which may be configured to adjust one or more components that service an environment, similar to the diagram from FIG. 4.

FIG. 5 depicts an exemplary calculator 310, which may be configured to adjust one or more components that service an environment 102, similar to the diagram from FIG. 4. Although a wire-line device is illustrated, this discussion can be applied to wireless devices, as well. Generally, in terms of hardware architecture, as shown in FIG. 5, the calculator 310 includes a processor 582, memory component 584, a display interface 594, data storage 595, one or more input and/or output (I/O) device interface(s) 596, and/or one or more network interface 598 that are communicatively coupled via a local interface 592. The local interface 592 can include, for example but not limited to, one or more buses or other wired or wireless connections. The local interface 592 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 582 may be a device for executing software, particularly software stored in memory component 584.

The processor 582 can be any custom made or commercially available processor, a central processing unit (CPU), an auxiliary processor among several processors associated with the calculator 310, a semiconductor based microprocessor (in the form of a microchip or chip set), a macroprocessor, or generally any device for executing software instructions.

The memory component 584 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 584 may incorporate electronic, magnetic, optical, and/or other types of storage media. One should note that the memory component 584 can have a distributed architecture (where various components are situated remote from one another), but can be accessed by the processor 582. Additionally, the memory component 584 can include control logic 599 and an operating system 586.

The software in memory component 584 may include one or more separate programs, each of which includes an ordered listing of executable instructions for implementing logical functions. In the example of FIG. 5, the software in the memory component 584 may include control logic 599, as well as operating system 586. The operating system 586 essentially controls the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 584, so as to operate properly in connection with the operating system 586.

The Input/Output devices that may be coupled to system I/O Interface(s) 596 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more network interfaces 598 for facilitating communication with one or more other devices. More specifically, network interface 598 may include any component configured to facilitate a connection with another device. While in some embodiments, among others, the calculator 310 can include a network interface 598 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include network interfaces 598 for communicating via a wired connection. Such interfaces may be configured with Universal Serial Bus (USB) interfaces, serial ports, and/or other interfaces.

If calculator 310 includes a personal computer, workstation, or the like, the software in the memory component 584 may further include a basic input output system (BIOS) (omitted for simplicity). The BIOS is a set of software routines that initialize and test hardware at startup, start the operating system 586, and support the transfer of data among the hardware devices. The BIOS is stored in ROM so that the BIOS can be executed when the calculator 310 is activated.

When calculator 310 is in operation, the processor 582 may be configured to execute software stored within the memory component 584, to communicate data to and from the memory component 584, and to generally control operations of the calculator 310 pursuant to the software. Software in memory, in whole or in part, may be read by the processor 582, perhaps buffered within the processor 582, and then executed.

One should note that while the description with respect to FIG. 5 includes a calculator a single component, this is a nonlimiting example. More specifically, in at least one embodiment, calculator 310 can include a plurality of servers, personal computers, and/or other devices. Similarly, while control logic 599 is illustrated in FIG. 5 as a single software component, this is also a nonlimiting example. In at least one embodiment, control logic 599 may include one or more components, embodied in software, hardware, and/or firmware. Additionally, while control logic 599 is depicted as residing on a single computing device, as calculator 310 may include one or more devices, control logic 599 may include one or more components residing on one or more different devices.

Figure 6:
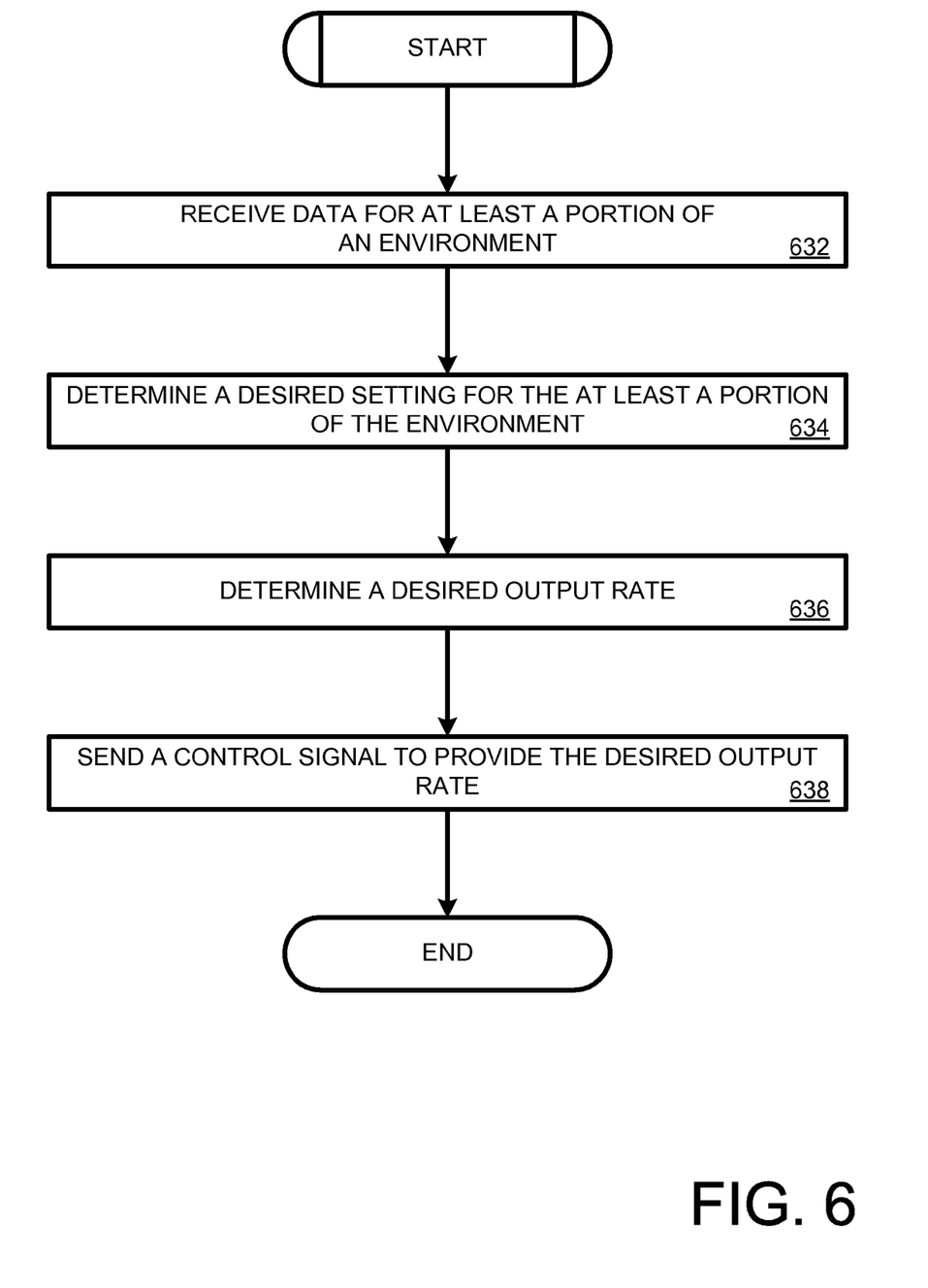
FIG. 6 depicts a flowchart illustrating an exemplary process that may be utilized for determining a desired output rate, such as with the environment of FIG. 1.

FIG. 6 depicts a flowchart illustrating an exemplary process that may be utilized for determining a desired output rate, such as with the environment 102 from FIG. 1. As illustrated in the nonlimiting example of FIG. 6, data for at least a portion of an environment 102 can be received (block 632). As discussed above, depending on the particular configuration, the data may be received by the calculator 310 from one or more sensors, interfaces, and/or via other techniques. A desired setting for the at least a portion of the environment can be determined (block 634). The setting may be determined via a determination of the current environment conditions, a determination of the nature of a change in the environment, and a calculation of the predicted effect of the change. An output rate can also be determined (block 636). The output rate may be determined based on the determined setting, as well as a calculation of the adjustments to meet the desired setting. Additionally, a control signal may be to provide a desired output rate (block 638).

Figure 7:
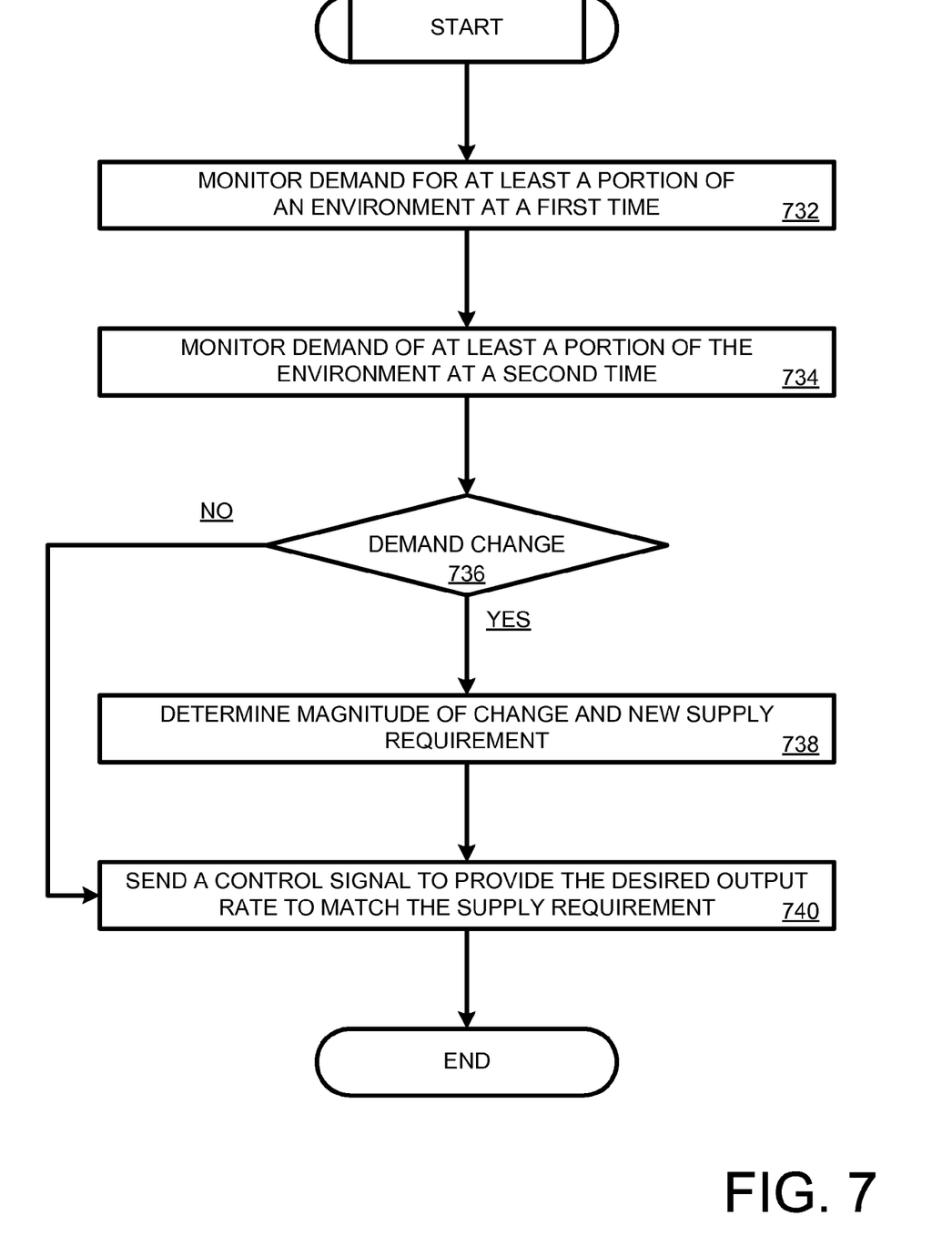
FIG. 7 depicts a flowchart illustrating an exemplary process that may be utilized for providing a desired output rate of service to an environment, similar to the diagram from FIG. 6.

FIG. 7 depicts a flowchart illustrating an exemplary process that may be utilized for providing a desired output rate of service to an environment, such as the environment 102, similar to the diagram from FIG. 6. As illustrated in the nonlimiting example of FIG. 7, demand for at least a portion of the environment 102 can be monitored for a first time (block 732). Demand of at least a portion of the environment 102 can be monitored at a second time (block 734). A determination can be made whether demand has changed (block 736). As discussed above, the demand may change based on any of a plurality of factors, such as people entering the environment, change in time of day, change in computer processing, and/or other changes. If demand has changed, the magnitude of change and a new supply requirement can be determined (block 738). More specifically, as discussed above, the nature of the change can be determined. Additionally, a new supply can be calculated based on the change and/or other factors. The process can then proceed to block 740. If, at block 736, no demand change occurs, the process can proceed directly to block 740 to send a control signal to provide the desired output rate to match the supply requirement (block 740).

Figure 8:
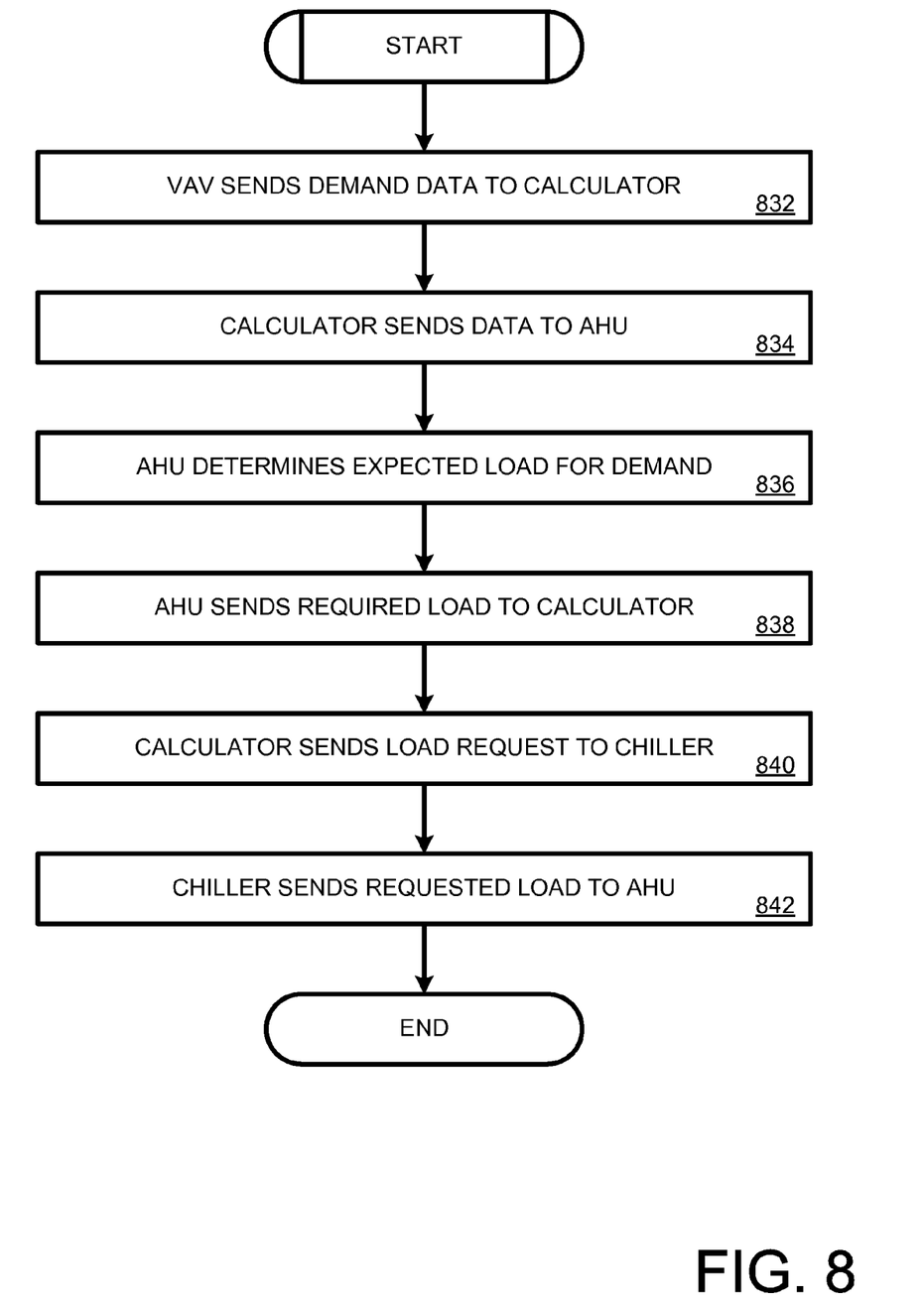
FIG. 8 depicts a flowchart illustrating an exemplary process that may be utilized for providing service to an environment, similar to the diagram from FIG. 7.

FIG. 8 depicts a flowchart illustrating an exemplary process that may be utilized for providing service to an environment, such as the environment 102, similar to the diagram from FIG. 7. As illustrated in the nonlimiting example of FIG. 8, the VAV 108 can send demand data to the calculator 310 (block 832). The demand data may include data associated with keeping the environment 102 at a certain temperature, at a certain humidity, and/or other demand-related indicators. The calculator 310 can send control data to the AHU 106 (block 834) for controlling the AHU 106, the VAV 108, and/or other components to meet the desired demand. The AHU 106 and/or the calculator 310 can determine an expected load to meet the demand (block 836). More specifically, a calculation can be made to determine desired actions to meet the determined demand. The AHU 106 can send the required load to the calculator 310 (block 838). The calculator can send the load request to the chiller 104 (block 840). The chiller 104 can then send the requested load to the AHU (block 842).

Figure 9:
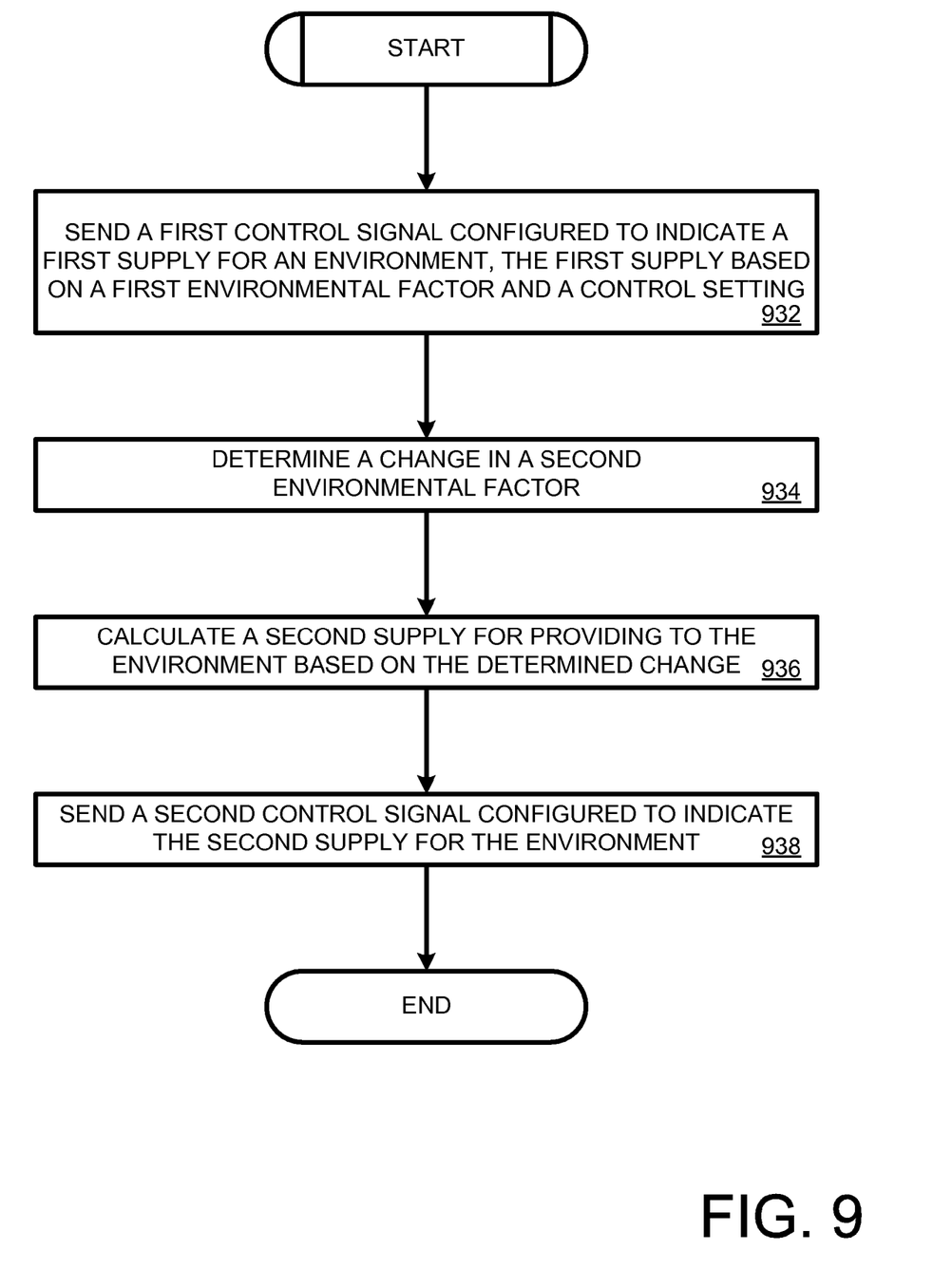
FIG. 9 depicts a flowchart illustrating yet another exemplary process that may be utilized for providing service to an environment, similar to the diagram from FIG. 8.

FIG. 9 depicts a flowchart illustrating yet another exemplary process that may be utilized for providing service to an environment, such as the environment 102, similar to the diagram from FIG. 8. As illustrated in the nonlimiting example of FIG. 9, a first control signal may be sent (block 932). The first control signal may be configured to indicate a first supply for an environment. The first supply may be based on a first environmental factor and a control setting. More specifically, in an exemplary embodiment, the calculator 310 may be configured to determine a desired temperature for an environment. The supply may be determined based on the current temperature of the environment and a thermostat setting. Additionally, a change in a second environmental factor may be determined (block 934). More specifically, the second environmental factor may include people entering the environment, time of day, received sunlight, computing devices that are currently operating, etc. (as discussed above). A second supply can then be calculated for the environment 102, based on the determined change (block 936). Additionally, a second control signal may be sent, where the second control signal is configured to indicate the second supply for the environment 102 (block 938).

One should also note that conditional language, such as, among others, "scan," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Therefore, at least the following is claimed:

1. A method comprising:
    monitoring a first environmental factor of an environment;
    sending a first control signal to set a first supply for the environment, the first supply being based, at least in part, on the first environmental factor and a predefined business strategy;
    monitoring a second environmental factor of the environment, the second environmental factor exhibiting a correlation with respect to the first environmental factor;
    determining a change in the second environmental factor;
    storing data related to the determined change;
    predicting a future change in the second environmental factor based, at least in part, on the stored data;
    calculating a second supply for the environment based, at least in part, on the predicted future change and the predefined business strategy; and
    sending a second control signal to set the second supply at a time associated with a predicted occurrence of the predicted future change such that the second control signal is sent to alter the environment prior to the predicted occurrence.

2. The method of claim 1, wherein the second environmental factor corresponds to a number of people in the environment.

3. The method of claim 1, wherein the first control signal and the second control signal are sent to a heating ventilation and cooling (HVAC) system.

4. The method of claim 1, wherein the first control signal and second control signal are configured to facilitate control of at least one of the following: temperature, humidity, electrical power, and ventilation.

5. The method of claim 1, wherein the first control signal and the second control signal are configured to facilitate control of a portion of the environment.

6. The method of claim 1, wherein the monitoring, the determining, the storing, the predicting and the calculating are performed remotely from the environment.

7. The method of claim 1, wherein the environment is a first of multiple environments being monitored.

8. A system comprising:
    a first monitoring component operative to monitor a first environmental factor of an environment;
    a sending component operative to send a first control signal to set a first supply for the environment, the first supply being based, at least in part, on a first environmental factor and a predefined business strategy;
    a second monitoring component operative to monitor a second environmental factor of the environment, the second environmental factor exhibiting a correlation with respect to the first environmental factor;
    a determining component operative to determine a change in the second environmental factor;
    a storing component operative to store data related to the determined change;
    a predicting component operative to predict a future change in the second environmental factor based, at least in part, on the stored data; and
    a calculating component operative to calculate a second supply for the environment based, at least in part, on the predicted future change and the predefined business strategy;
    wherein the sending component is further operative to send a second control signal to set the second supply at a time associated with a predicted occurrence of the predicted future change such that the second control signal is sent to alter the environment prior to the predicted occurrence.

9. The system of claim 8, wherein the second environmental factor corresponds to a number of computing devices that are operating in the environment.

10. The system of claim 8, wherein the first control signal and second control signal are configured to facilitate control of at least one of the following: temperature, humidity, electrical power, and ventilation.

11. The system of claim 8, wherein the first control signal and the second control signal are configured to facilitate control of a portion of the environment.

12. The system of claim 8, wherein the calculating component comprises a non-transitory computer-readable medium.

13. The system of claim 8, wherein the monitoring component, the determining component, the storing component, the predicting component and the calculating component are located remotely from the environment.

14. The system of claim 8, wherein the environment is a first of multiple environments being monitored.

15. A system comprising:
- means for monitoring a first environmental factor of an environment;
- means for sending a first control signal, the first control signal configured to indicate a first supply for an environment, the first supply based on a first environmental factor and a control setting;
- means for monitoring a second environmental factor of the environment, the second environmental factor exhibiting a correlation with respect to the first environmental factor;
- means for determining a change in the second environmental factor;
- means for storing data related to the determined change;
- means for predicting a future change in the second environmental factor based, at least in part, on the stored data; and
- means for calculating a second supply for the environment based, at least in part, on the predicted future change;
- wherein the means for sending is further operative to send a second control signal to set the second supply at a time associated with a predicted occurrence of the predicted future change such that the second control signal is sent to alter the environment prior to the predicted occurrence.

16. The system of claim 15, wherein the second environmental factor comprises time of day.

17. The system of claim 15, wherein the means for monitoring the first environmental factor monitors temperature.

18. The system of claim 15, wherein the first control signal and the second control signal are configured to facilitate control of a portion of the environment.

19. The system of claim 15, wherein the means for monitoring, the means for determining, the means for storing, the means for predicting and the means for calculating are located remotely from the environment.

20. The system of claim 15, wherein the environment is a first of multiple environments being monitored.

* * * * *